United States Patent [19]

Brahm et al.

[11] Patent Number: 5,330,309
[45] Date of Patent: Jul. 19, 1994

[54] READER HAVING CASSETTE LOCATING AND UNLATCHING MECHANISM

[75] Inventors: Roger S. Brahm, Canandaigua, N.Y.; James D. Lattimore, Safety Harbor, Fla.

[73] Assignee: Eastman Kodak Company, Rochester, N.Y.

[21] Appl. No.: 982,175

[22] Filed: Nov. 25, 1992

[51] Int. Cl.$^5$ .................. B65D 85/30; G03B 41/00
[52] U.S. Cl. .................. 414/411; 414/416; 414/786
[58] Field of Search .................. 414/411, 416, 786; 250/327.2 D, 327.2 E, 327.2 J; 53/284.4, 381.4

[56] References Cited

U.S. PATENT DOCUMENTS

| | | | |
|---|---|---|---|
| 3,111,585 | 11/1963 | Sano et al. | 414/411 |
| 3,881,605 | 5/1975 | Grossman | 414/416 X |
| 3,906,325 | 9/1975 | Salmon | 318/569 |
| 4,354,336 | 10/1982 | Azzaroni | 414/411 X |
| 4,543,480 | 9/1985 | Kato | 250/484.1 X |
| 4,611,967 | 9/1986 | Tsutsui | 414/411 |
| 4,681,227 | 7/1987 | Tamura et al. | 250/484.1 X |
| 4,682,805 | 7/1987 | Reynolds | 102/444 |
| 4,705,953 | 11/1987 | Kimura | 250/484.1 |
| 4,754,144 | 6/1988 | Seto | 250/484.1 |
| 4,758,127 | 7/1988 | Imai et al. | 414/411 |
| 4,761,554 | 8/1988 | Yoshimura et al. | 250/327.2 |
| 4,771,174 | 9/1988 | Torii | 250/327.2 |
| 4,775,138 | 10/1988 | Müller | 414/411 X |
| 4,789,782 | 12/1988 | Ohara et al. | 250/327.2 |
| 4,820,930 | 4/1989 | Tsutsui et al. | 414/416 X |
| 4,827,136 | 5/1989 | Bishop et al. | 250/484.1 |
| 4,870,285 | 9/1989 | Ohgoda | 250/327.2 |
| 4,889,989 | 12/1989 | Yoshimura et al. | 414/411 X |
| 4,904,868 | 2/1990 | Kohda et al. | 250/327.2 |
| 4,908,520 | 3/1990 | Saotome et al. | 250/327.2 |
| 4,931,641 | 6/1990 | Ohgoda | 250/327.2 |
| 4,950,987 | 8/1990 | Vranish | 324/207.23 |
| 4,987,308 | 1/1991 | Tamura et al. | 250/484.1 |
| 5,004,393 | 4/1991 | Lunka et al. | 414/416 X |
| 5,042,223 | 8/1991 | Gerbaud | 53/55 |
| 5,081,357 | 1/1992 | Agano | 250/327.2 |
| 5,107,115 | 4/1992 | Torii | 250/327.2 |
| 5,138,160 | 8/1992 | Shimizu et al. | 250/327.2 |

FOREIGN PATENT DOCUMENTS

| | | | |
|---|---|---|---|
| 64928 | 4/1982 | Japan | 414/411 |
| 265445 | 11/1988 | Japan | 414/411 |

Primary Examiner—David A. Bucci
Attorney, Agent, or Firm—Peter J. Bilinski

[57] ABSTRACT

A method and apparatus for unlatching a stationary cassette having a latching mechanism for allowing removal of a photographic element disposed within the cassette. The cassette having a removable end cap, the end cap having a alignment opening and at least one access opening for allowing access to the latching mechanism. The apparatus having a stage, a mechanism for moving the stage in a first direction with respect to the cassette, an extractor bar assembly moveably mounted to the stage for movement in a second direction with respect to the cassette, the extractor bar assembly having unlatching member for unlatching the latching mechanism of the cassette and for removing the removable photographic element disposed in the cassette, a mechanism for moving the extractor bar assembly in the second direction, and a locating member for locating the extractor bar assembly in a first relative position with respect to the latching mechanism of the cassette.

53 Claims, 16 Drawing Sheets

READER HAVING CASSETTE LOCATING AND UNLATCHING MECHANISM

FIELD OF THE INVENTION

The present invention is directed to a device for removing an element from a cassette containing a photosensitive material and more particularly, to a reader designed to extract a stimulable phosphorus plate from a cassette containing the stimulable phosphorus plate.

BACKGROUND OF THE INVENTION

Storage phosphorus film is read by photoelectrically detecting an image formed by scanning with stimulating radiation. An example of such scanner/reader is disclosed in U.S. Pat. No. 4,789,782 to O'Hara. Typically the cassette is fed to the reader either individually, or by an autoloader such as that described U.S. application Ser. No. 07/981,719 filed Nov. 25, 1993 entitled "Autoloader for Photos or Other Cassettes and/or Pallets Containing a Photosensitive Material", which is filed concurrently herewith and which is also incorporated herein by reference. The autoloader provides cassettes in seriatim to the reader. Typically, some type of mechanism is used to remove the photosensitive material from within the cassette. The autoloader allows a plurality of individual cassettes to be placed therein for automatic supplying to the reader, thus freeing the operator to accomplish other duties. With such autoloaders it is important to provide a mechanism to properly present the cassette at the same place each time. Likewise, the mechanism in the reader must be able to remove the photosensitive material from the cassette and return it to the cassette after it has been properly scanned and erased. The problem with such prior art devices is that there must be extreme accuracy in order for the mechanism within the reader to properly remove the photosensitive element from the cassette. Typically, in order to accomplish this, it is necessary to precisely place every cassette in the exact same position so that the extractor mechanism in the reader can properly align with the latching mechanism provided in the cassette. While prior art devices can provide the cassettes in generally the same location, it is extremely difficult to position the cassette always in the same position. This is made even more difficult due to the normal wear of the positioning mechanism in the autoloader. Additionally, manufacturing tolerances in the cassette may result in the latching mechanism not being located precisely in the same position from one cassette to the next. Thus, variations in the presentation of the cassette and latching mechanism to the reader can occur from a number of factors. In order for the reader to operate effectively with the autoloader, it is important that the unlatching mechanism used to unlatch the cassette and remove the photosensitive material can be accurately aligned with the cassette, not only for removal, but also for returning of the photosensitive material back into the cassette. Prior art devices, in order to attempt a solution to the accurate positioning of the cassette, have had to resort to complex or expensive positioning and aligning mechanisms in order to accurately align the extraction mechanism with the latching mechanism on the cassette.

Applicants have invented a reader which utilizes a relatively simple mechanism for unlatching and latching of the cassette, that is able to accurately locate the cassette even if the cassette is not presented exactly in the same position each time a cassette is fed to the reader and can also take into consideration normal manufacturing tolerances of the cassette. This and other advantages will be set forth in the detailed description of the present invention.

SUMMARY OF THE INVENTION

In one aspect of the invention there is provided an apparatus for unlatching a stationary cassette having a latching mechanism for allowing removal of a photographic element disposed within the cassette. The cassette having a removable end cap, the end cap having reference means for locating a first relative position with respect to the latching mechanism and at least one access opening for allowing access to the latching mechanism. The apparatus comprising:

a stage;

means for moving the stage in a first direction with respect to the cassette;

an extractor bar assembly moveably mounted to the stage for movement in a second direction with respect to the cassette, the extractor bar assembly having unlatching means for unlatching the latching mechanism of the cassette and for removing the removable photographic element disposed in the cassette;

means for moving the extractor bar assembly in the second direction; and means for locating the extractor bar assembly in a first relative position with respect to the latching mechanism of the cassette.

In another aspect of the present invention there is provided a method of unlatching a cassette and removing a photographic element disposed therein. The cassette includes a latching mechanism for latching and unlatching the photographic element from the cassette. The method comprising the steps of:

providing an apparatus for unlatching a cassette and removing a photographic element therefrom, said apparatus comprising:

a stage;

means for moving said stage in a first direction with respect to the cassette placed in said means for clamping the cassette;

an extractor bar assembly moveably mounted to said stage for movement in a second direction with respect to the cassette, said extractor bar assembly having means for unlatching and latching the latching mechanism of the cassette and for removing the removable photographic element disposed in the cassette;

means for moving the extractor bar assembly in the second direction; and means for determining a first relative position between the latching mechanism of the cassette and the extractor bar assembly;

moving the extractor bar to a first seek position at a predetermined distance from the latching mechanism; and moving the extractor bar in a transverse direction until the first relative position is determined.

DETAILED DESCRIPTION OF THE INVENTION

Figure 9:
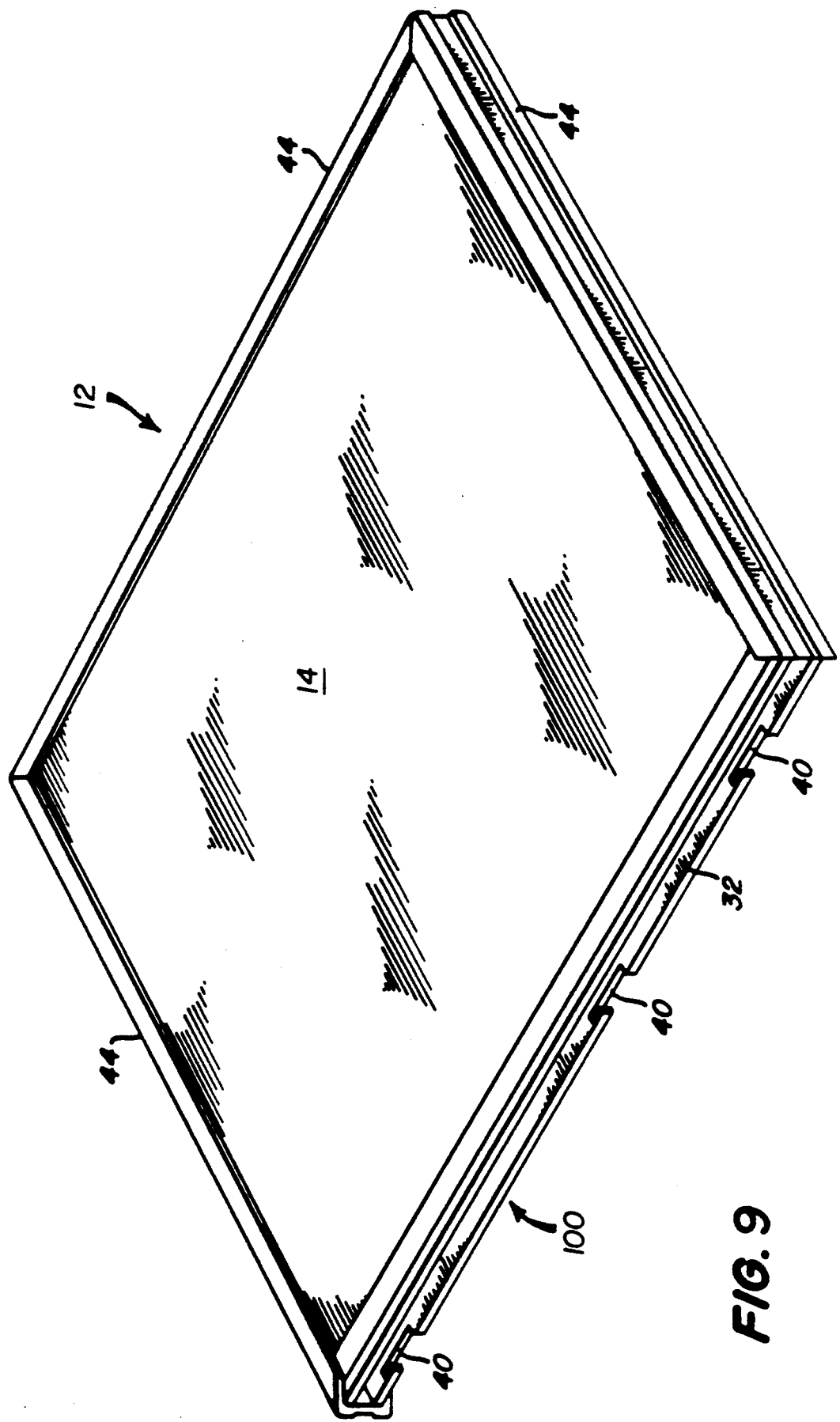
Figure 10:
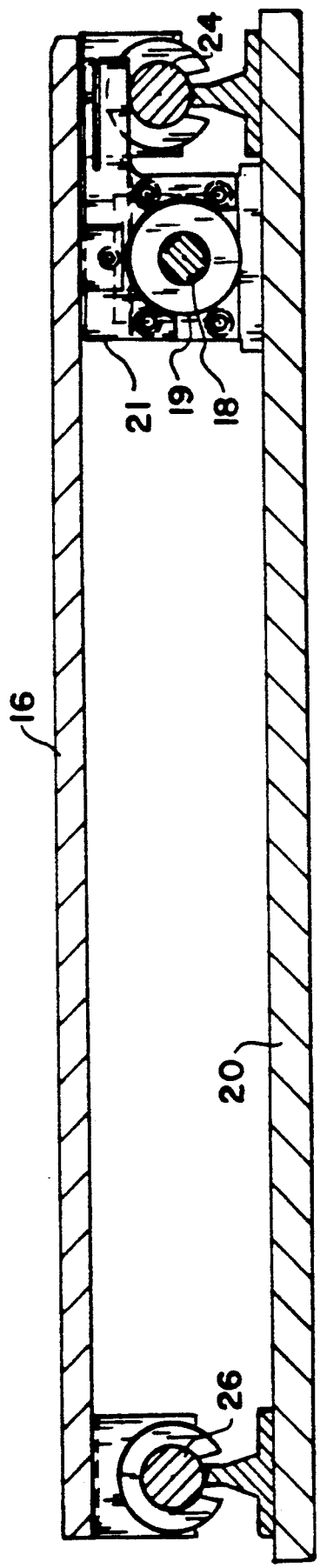

FIG. 9 is a perspective view of a cassette useful in the present invention. FIG. 10 is a cross-sectional view of the stage assembly shown in FIG. 1 taken along line 10—10.

Figure 1:
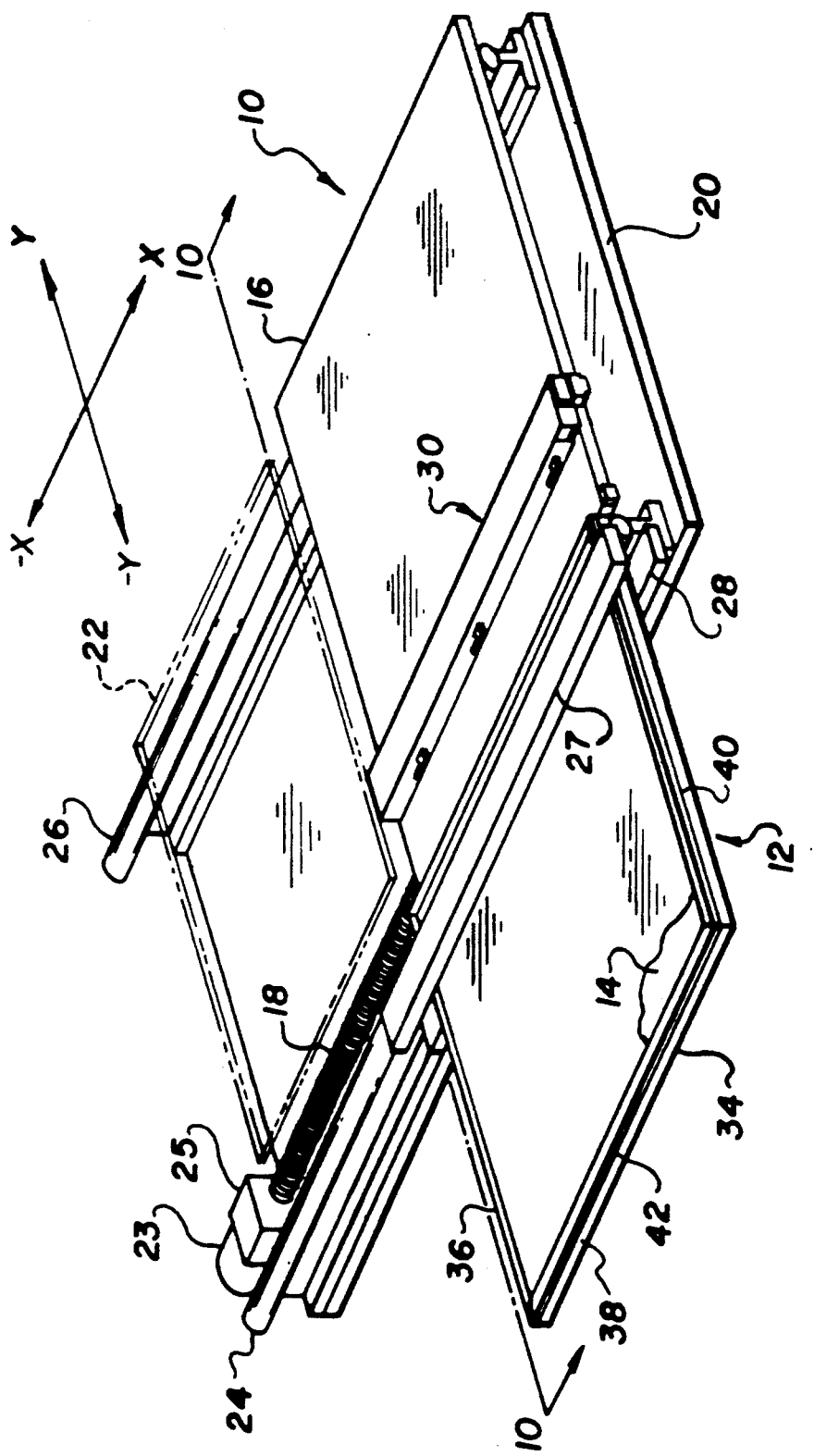
FIG. 1 is a perspective view of the mechanism in a reader used to unlatch and remove the photosensitive element from the cassette and for transporting of the photosensitive material within a reader for obtaining of the latent image storage thereon, and insertion of the photosensitive element into the cassette and latching the cassette.
Figure 2:
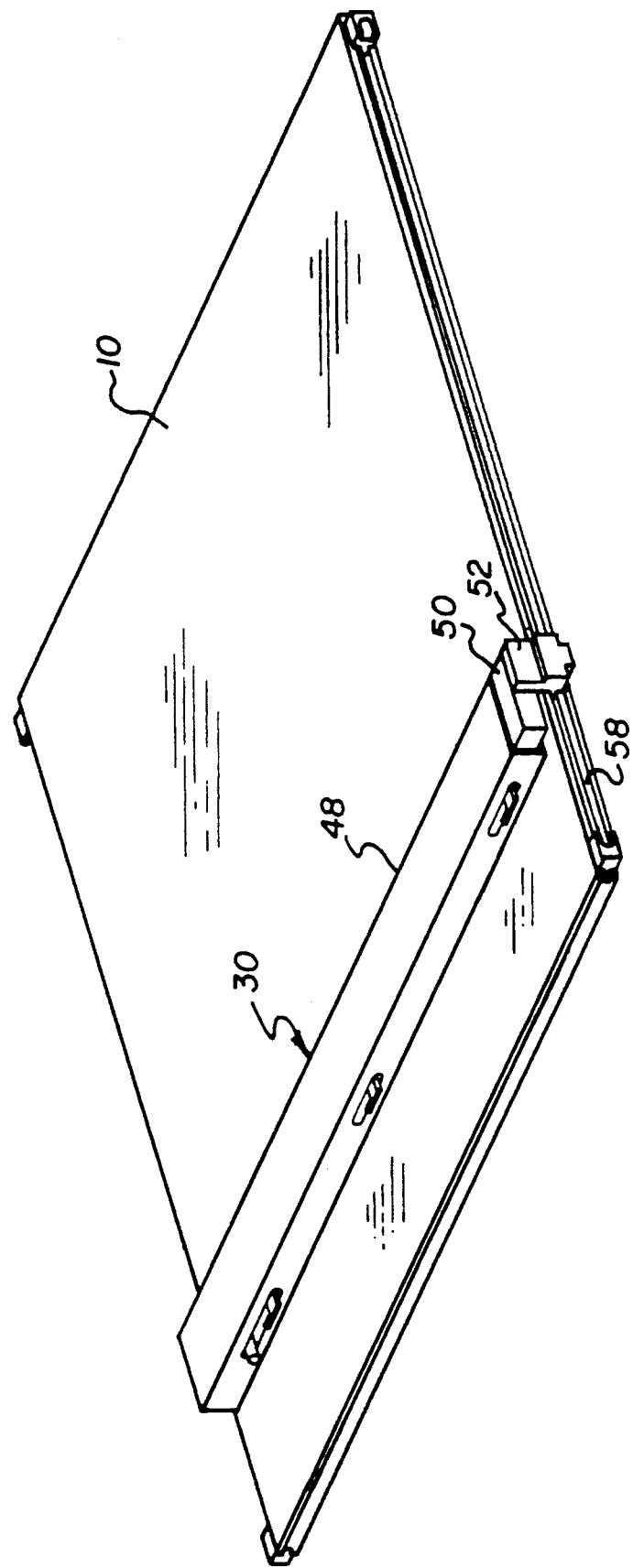
FIG. 2 is a perspective view of the portion of the mechanism of FIG. 1 used to locate and unlatch and remove the photosensitive element from the cassette and later return the photosensitive element into the cassette.
Figure 3:
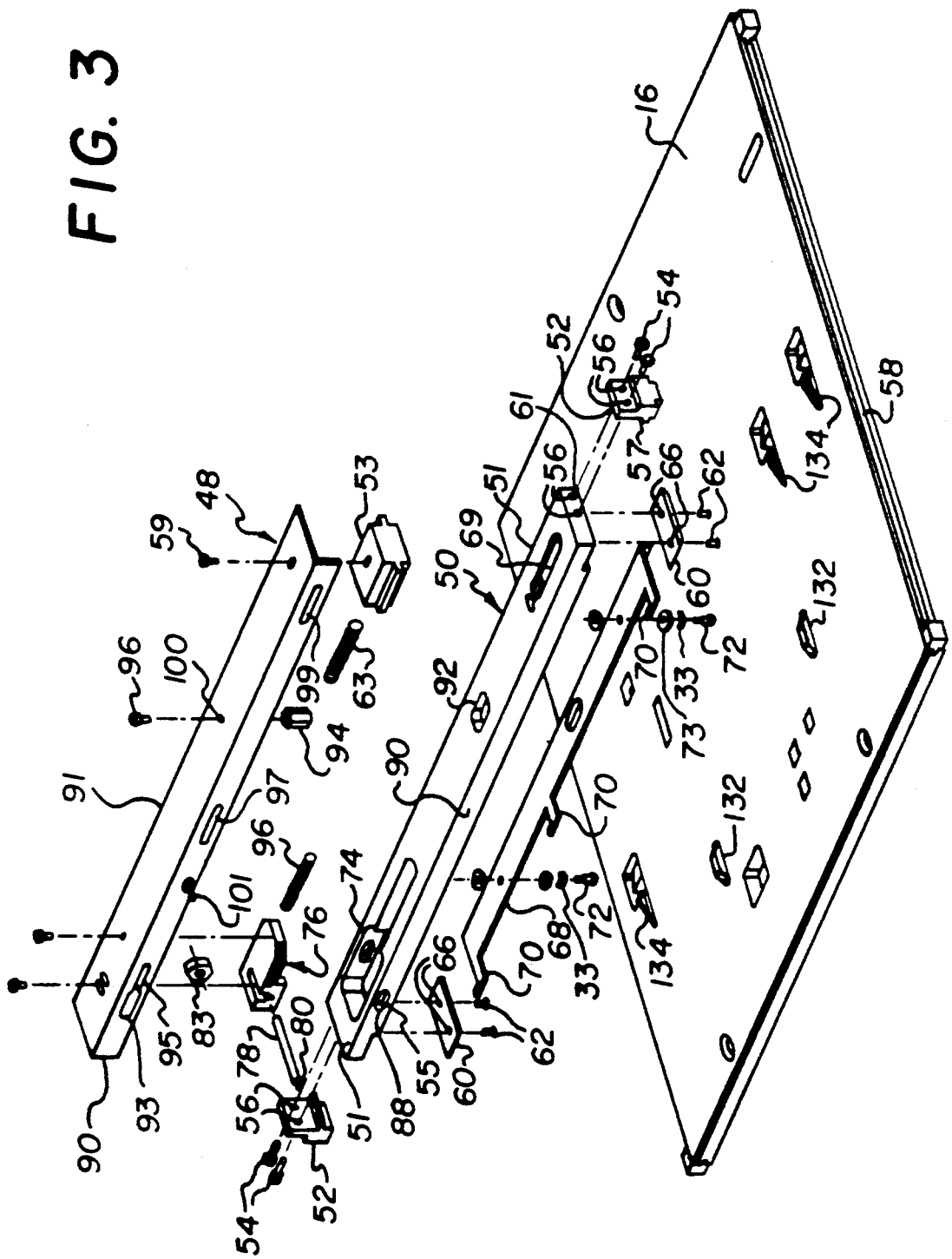
FIG. 3 is an exploded perspective view of the assembly of FIG. 2.

Referring to FIGS. 1–3 there is illustrated a mechanism 10 designed to be placed in a reader for scanning a photosensitive material. In the particular embodiment illustrated, the mechanism 10 is designed to receive a cassette 12 having a photosensitive element disposed therein. In the particular embodiment illustrated, the mechanism is designed to receive a cassette 12 having a stimulable phosphorus plate/sheet 14 (see FIG. 4F) capable of retaining a latent image thereon which upon photoradiation stimulation. A digital image can be extracted for later viewing or development of a x-ray film. Such photostimulable phosphorus plates are well known and described in the prior art. The reader is of the raster scanner-type as discussed in U.S. application Ser. No. 07/981,716 filed Nov. 25, 1992, entitled "Precision Moving Stage", of Paul Askins, and which is hereby incorporated by reference. Briefly, when the image on the stimulable phosphorus plate 14 is exposed to a stimulating ray beam, such as a laser beam, this will cause the stimulable phosphorus sheet to emit a light in proportion to a stored radiation energy. The light thus emitted by the stimulable phosphorus plate is photoelectrically detected and converted to an electrical signal, and the radiation image of the object is reproduced visually by exposure of the image signal on a recording medium such as a photographic film.

The stimulating of the stimulable plate by a laser beam is typically done using a raster scanning technique. The mechanism 10 includes a movable stage 16 which includes a drive screw 18 which is mounted to base 20 of the reader. The drive screw 18 is in threaded engagement with a drive nut 19 which engages the movable stage 16 by element 21 so as to move the stage 16 from the receiving position illustrated in FIG. 1 to the scanned position 22 illustrated by dash lines also in FIG. 1. An appropriate stepper motor 23 and corresponding transmission 25 is provided for rotating the drive screw 18 such that the stage 16 can move in the X direction. The stage 16 is supported by a pair of guide rails 24,26 which are axially spaced apart and secured to the base 20. Guide rails 24,26 and drive screw 18 are in substantial parallel alignment with each other. The details of construction of the stage assembly and the means by which it may be moved in the X direction are more fully described in co-pending application of Paul Askins previously discussed. However, it is to be understood that any appropriate means may be used for driving stage 16 in the X direction.

The reader includes a clamping mechanism 24 which includes an upper clamp jaw 27 and lower clamp jaw 28 which are used to clamp the cassette in a predetermined fixed position. The details of this clamping mechanism may take a variety of constructions. For the purpose of the present invention, however, a detailed description of a suitable clamping mechanism may be found in co-pending application entitled "Cassette Clamping Mechanism" of Michael Flynn, Wayne Arseneault, John Boutet, Jeffrey Yaskow, Thomas D. Baker, filed concurrently with this application, and which is also incorporate herein by reference.

Figure 6:
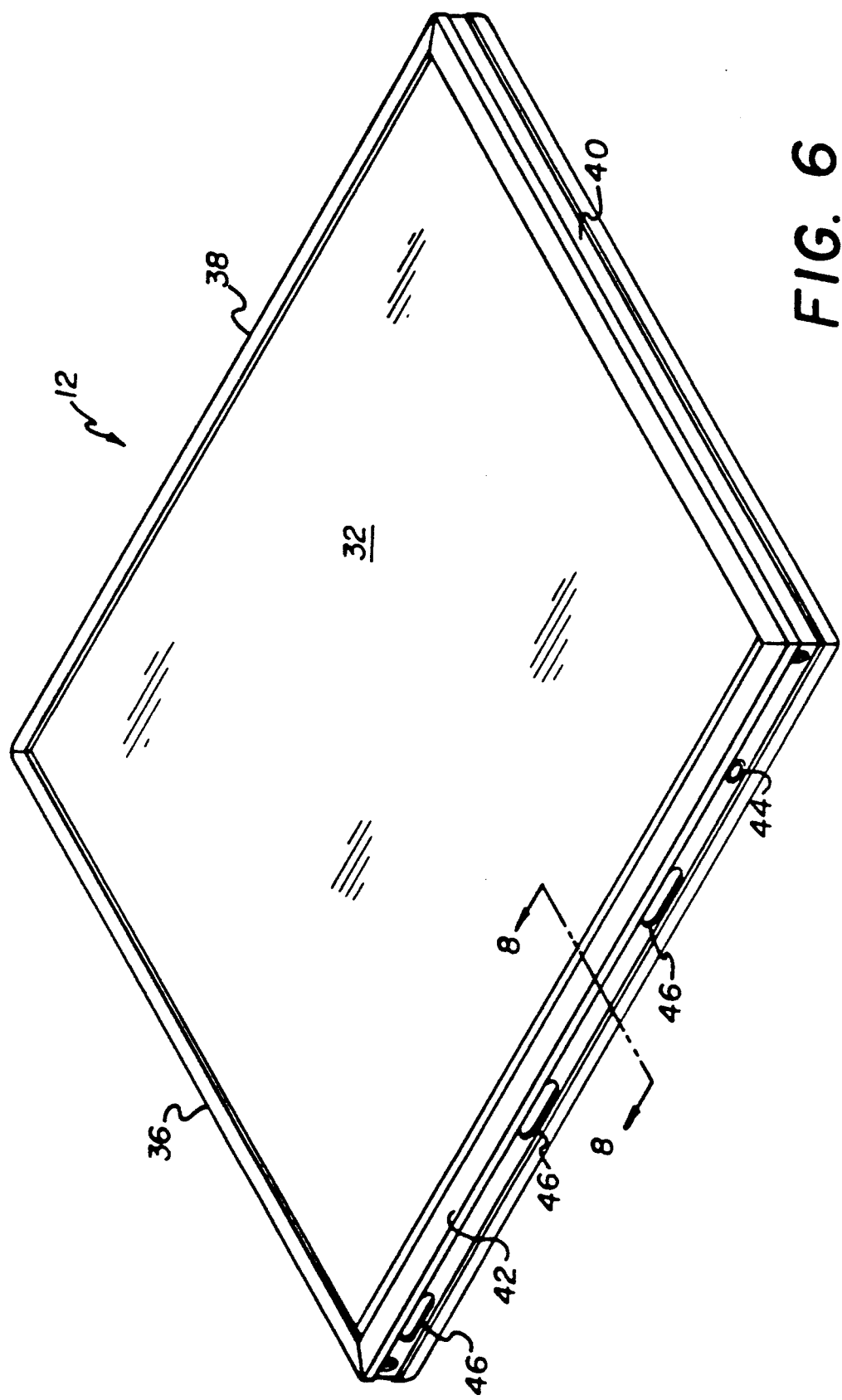
FIG. 6 is a perspective view of a cassette designed for use with mechanism of FIGS. 1–5.
Figure 7:
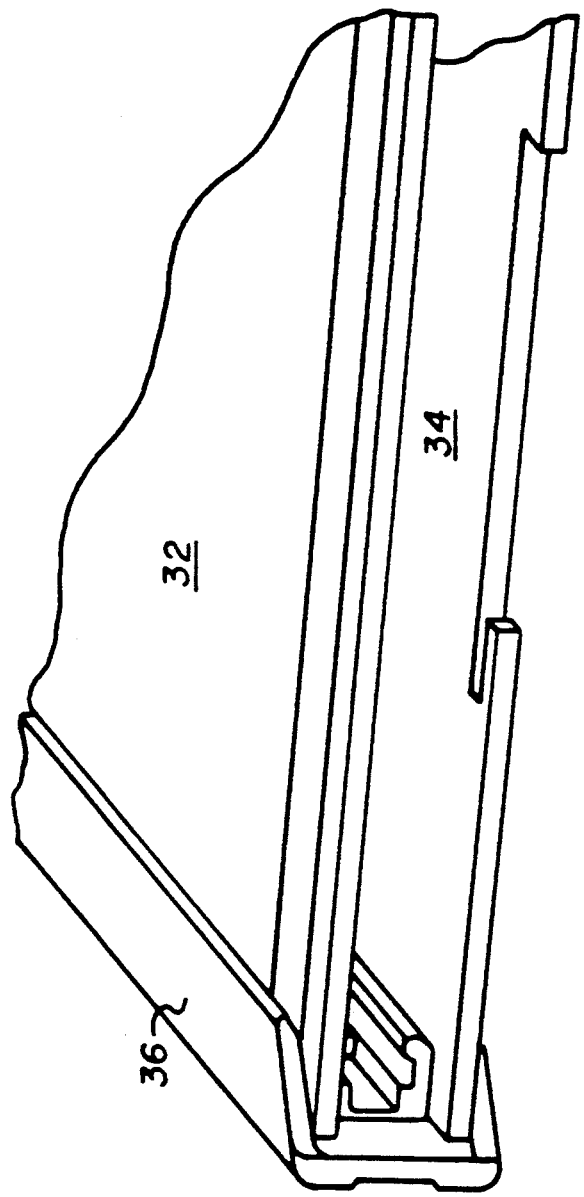
FIG. 7 is an enlarged partial view of the cassette of FIG. 6 with removeable end cap removed.
Figure 8:
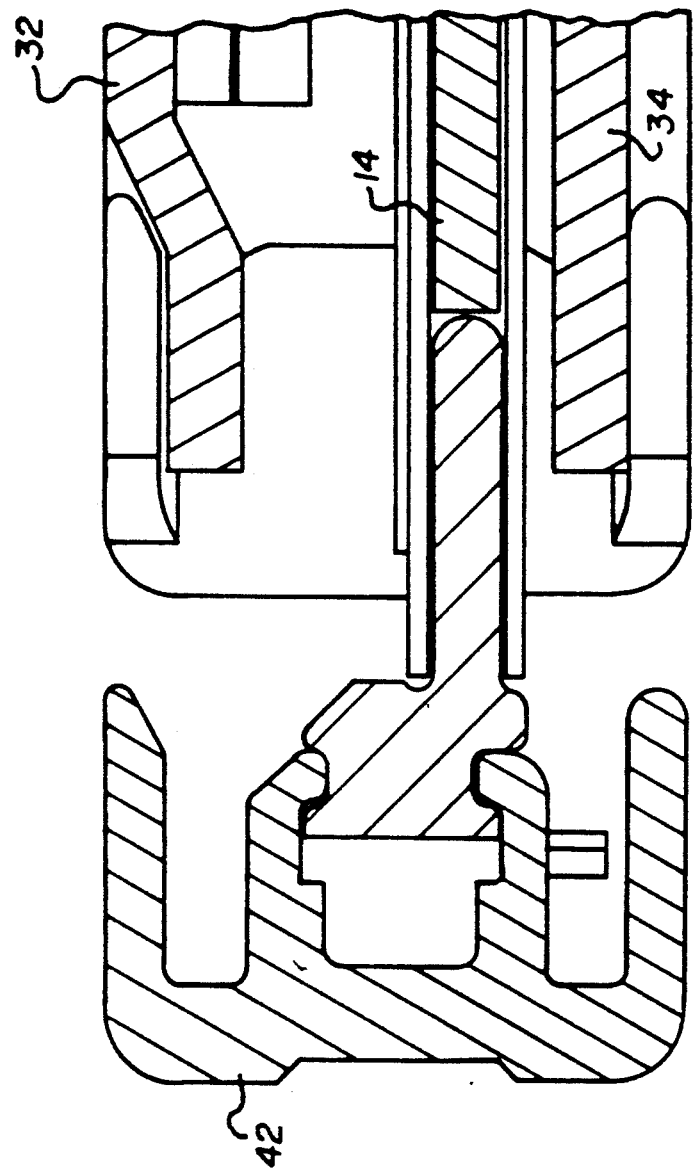
FIG. 8 is an enlarged cross-sectional view of the cassette of FIG. 6 as taken along line 8—8 with the end cap unlatched from the cassette.

The mechanism 10 includes an extractor bar assembly 30 which is mounted to stage 16 for movement in the Y direction. The X and Y directions as set forth in this application have been provided merely for the sake of clarity in describing the direction of movement of various parts, it being understood that any coordinate system may be substituted as desired. In the particular embodiment, the extractor bar assembly 30 is designed for movement to and away from the cassette 12, while the stage 16 moves in a direction substantially transverse to the end/side of the cassette facing the extractor bar assembly 30. The cassette 12 is of the type designed for removing the stimulable phosphorus element from the end/side of the cassette. Briefly, as shown in detail in FIGS. 6–8; the cassette 12 comprises a shell having upper and lower panels 32,34, respectively, and three side caps 36,38,40. A photographic plate 14 of the photostimulable phosphorous type is disposed therein and is secured to a removable end cap 42. The end cap 42 includes a latching mechanism for releasing the end cap 42 from the cassette 12. Additionally, the end cap 42 includes an alignment opening 44 disposed preferably along one side of the cassette 12. The end cap 42 further includes a plurality of access openings 46 designed to receive hook members designed to engage the latching mechanism disposed within the cassette (not shown). The latching 100, FIG. 9 is of a construction such that when the hook mechanism is moved in a particular direction, it will release the end cap 42 from the cassette 12 allowing the end cap 42 and attached stimulable phosphorus plate 14 to be removed therefrom. The details of construction of such a suitable cassette is described in U.S. patent application Ser. No. 800,799 to Jeffrey C. Robertson, filed Nov. 27, 1991, entitled which is incorporated herein by reference.

The extractor bar assembly 30 includes a locator slide plate 48, and a extractor bar 50 which are secured to each other such that the extractor bar 50 can slide relative to the slide plate 48. In the particular embodiment illustrated, the extractor bar 50 is designed to slide in the Y direction with respect to the slide plate 48. In order to assist the extractor bar 50 in moving along the X direction with respect to the slide plate 48, a guide block 53 is provided and is secured to slide plate 48 by a screw 59 which extends through an opening in slide plate 48. The guide block slides within a mating slot 69 in extractor bar 50. A spring biases block 53 within slot 69. The extractor bar 50 includes a pair of guide supports 52, one secured at each lateral end 51. In the particular embodiment illustrated, the guide-supports 52 are secured to extractor bar 50 by a pair of screws 54 which extend through openings 56 in guide supports 52 which engage a pair of corresponding threaded openings 61 in extractor bar 50. The guide supports 52 have a projection 57 which extend into a mating recess 58 provided in the edge of the stage 16 which allows the extractor bar to move in the Y direction. A pair of Teflon TM guide-bearing plates 60 are secured to the lateral ends 51 of the extractor bar 50 and provide a bearing surface on which the extractor bar 50 slides along the top of stage 16. In the preferred embodiment, the bearing plates 60 are secured to the extractor bar 50 by a pair of screws 62 which extend through openings 66 in bearing plates 60 and engage threaded openings (not shown) in the extractor bar 50. Secured to the bottom of extractor bar 50 is a closure hook bar 68 having a plurality of hook members 70 designed to enter openings 46 provided in cassette 12 and for unlatching the latching mechanism disposed within the cassette 12. The hook bar 68 may be secured to extractor bar 50 in any desired manner and, in the particular embodiment illustrated, is secured by a pair of shoulder screws 72 which engage a pair of threaded openings (not shown) provided in the extractor bar 50. A pair of washers disposed on the sides of the hook bar 68. A spring washer 33 is disposed between the shoulder of the shoulder screw 72 and the adjacent washer 73. In the embodiment illustrated the spring washers 33 are bow washers. Mounting of the hook bar in this manner allows the hook bar 62 to move so that it can align vertically with the mating openings in the cassette. The extractor bar 50 is provided with a recess 74 at one end for enclosing slide pin assembly 76 which is secured to slide plate 48. The slide pin assembly 76 includes a locator pin 78 having an engagement end 80 which comprises an inner locating portion 82 and an annular registration surface 84. The locating portion 82 is designed to engage the alignment opening 44 in cassette 12 while the registration surface 84 is designed to engage the area of the cassette surrounding the opening 44. The slide pin assembly 76 includes a magnet collar 83 which is secured to the rear end 85 of pin 78. A spring 86 is provided for normally biasing the pin 78 outward toward the cassette 12. An opening 88 is provided in the forward surface 90 of the extractor bar 50 which faces cassette 12 for allowing pin 78 to pass therethrough. The opening 88 is designed such that the pin 78 can move in a X direction with respect to the extractor bar 50 as will be discussed later herein. The slide plate 48 includes a top section 91 and a forward section 93 which is placed adjacent the forward surface 90 of extractor bar 50. The forward section 93 is provided with a plurality of openings 95,97,99 which allow hook members 70 to extend therethrough. Opening 95 also permits pin 78 to also extend therethrough.

Means are provided for biasing the slide plate 48 with respect to the extractor bar 50. In the particular embodiment illustrated, this is provided by a spring 96 which has one end secured to the slide plate 48 and the other end secured to the extractor bar 50. In the particular embodiment illustrated, the spring 96 is a extension spring.

A second recess 92 is provided in extractor bar 50 for receiving a magnetic housing 94 which is secured to slide plate 48. In the particular embodiment illustrated, magnetic housing 94 is secured by a screw 96 which engages a threaded opening 98 provided in magnetic housing and which passes through opening 100 in slide plate 48. Thus, the magnetic housing 94 is in a stationary position with respect to the slide plate 48. The recess 92 is such that the magnetic housing 94 can move a predetermined distance in the X direction.

The stage 16 is provided with a number of switches and sensors which are used to determine the location of the slide bar assembly 30 and provide information with regard to the status of the mechanism. These switches and sensors will be described in further detail in the description of the operation of the mechanism. A microprocessor (not shown) is provided in the reader as is typically done in the prior art. The microprocessor controls the operation of the various components provided and also monitors the various sensors provided in the device used to control and verify the operation of the reader.

Figure 5:
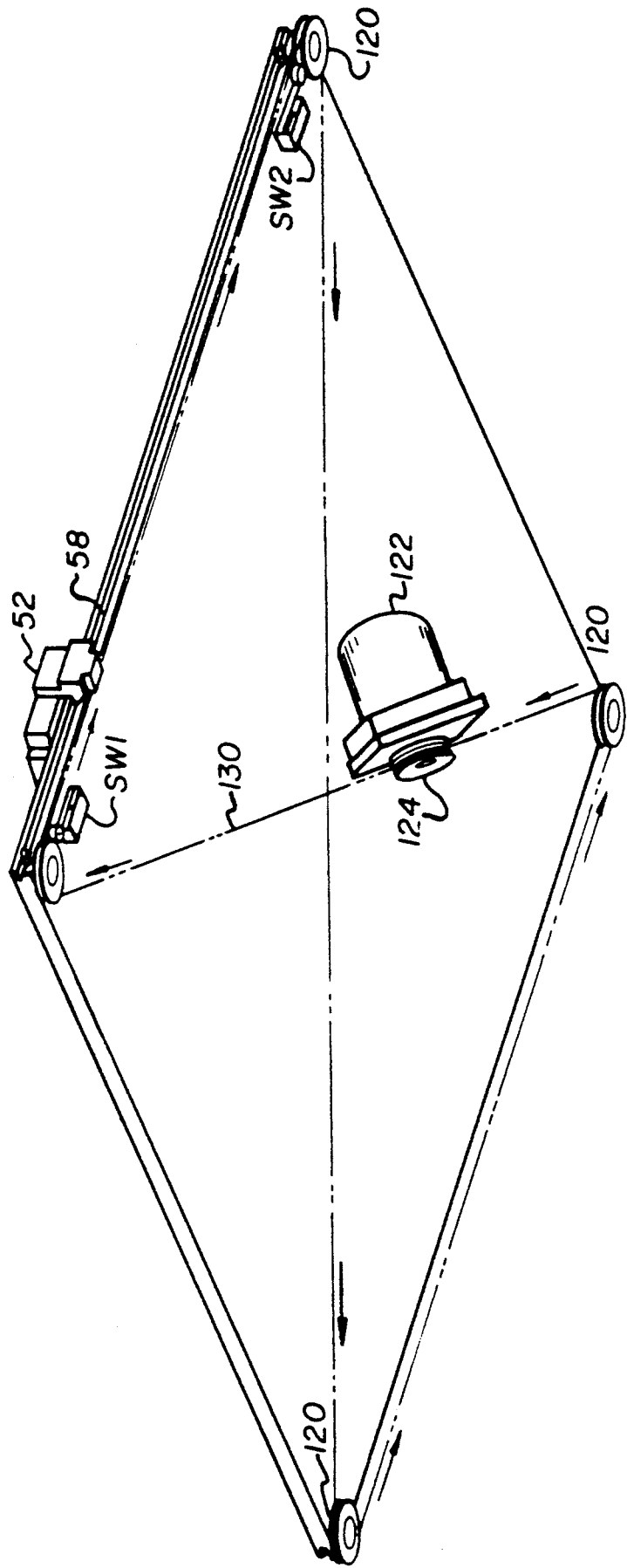
FIG. 5 is a bottom perspective view of the mechanism of FIG. 3 illustrating the means used to move the extractor bar assembly toward and away from the cassette.

Referring to FIG. 5, there is illustrated the mechanism used to move the extractor bar assembly 30 in the Y direction on stage 16. In particular, there are provided four pulleys 120, one disposed at each of the corners of the stage 16. A motor 122 is provided having a shaft to which is secured a drive pulley 124. The pulley 124 has a groove about its periphery designed to receive a cable 130. The cable is wrapped about the pulleys 120,124 in a closed loop. The cables are attached to the side projections such that when the motor is turned in a first direction, it will cause the extractor bar assembly 30 to move in a first Y direction and when rotated in the opposite direction, will cause the extractor bar assembly to move in the opposite Y direction. It is, of course, understood that any means may be employed for moving extractor bar assembly 30 in the Y direction.

Figure 4:
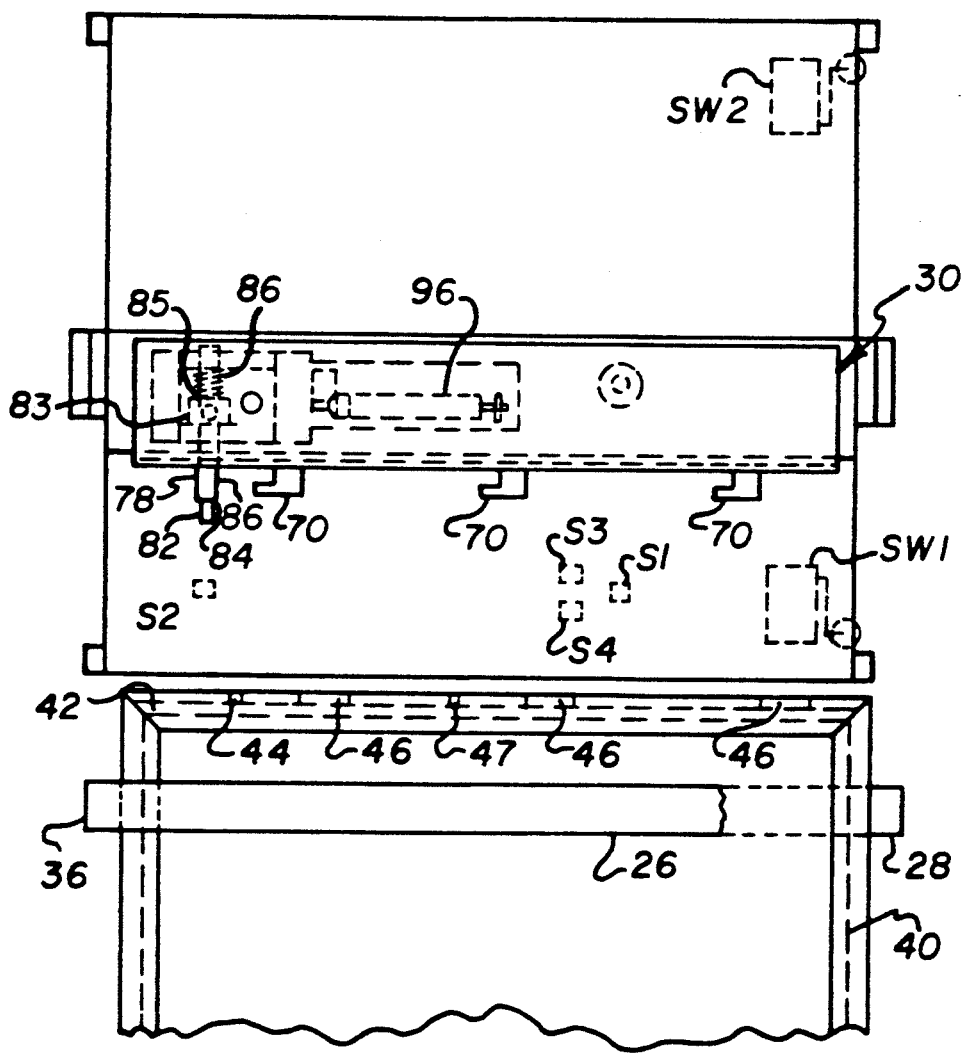
FIG. 4 is a top plan view of the plate extraction mechanism of FIGS. 2 and 3 illustrating the extractor bar assembly in the neutral position.
Figure 4A:
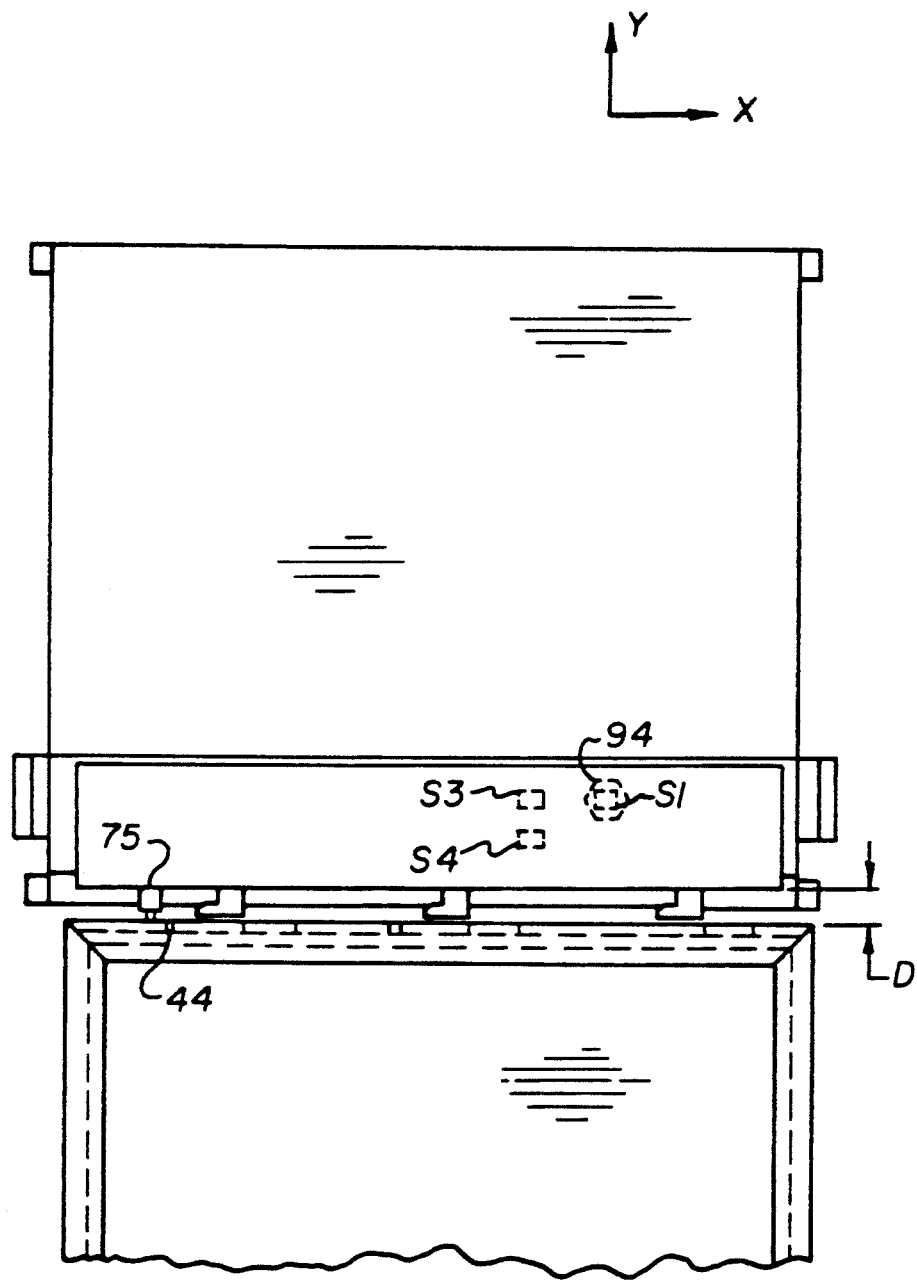
FIGS. 4A–4F illustrate the progressive movement of the extractor bar mechanism used in unlatching and removing the photosensitive element from the cassette.
Figure 4B:
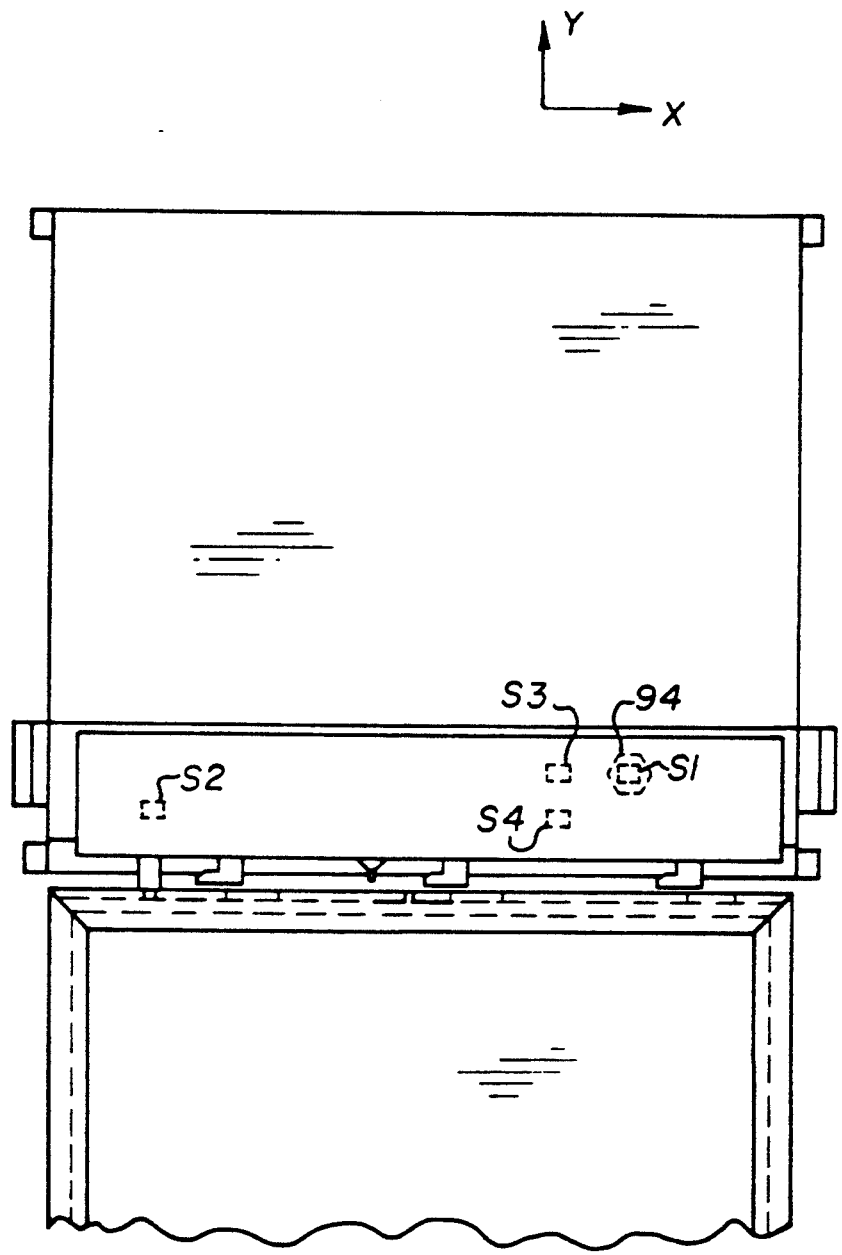
Figure 4C:
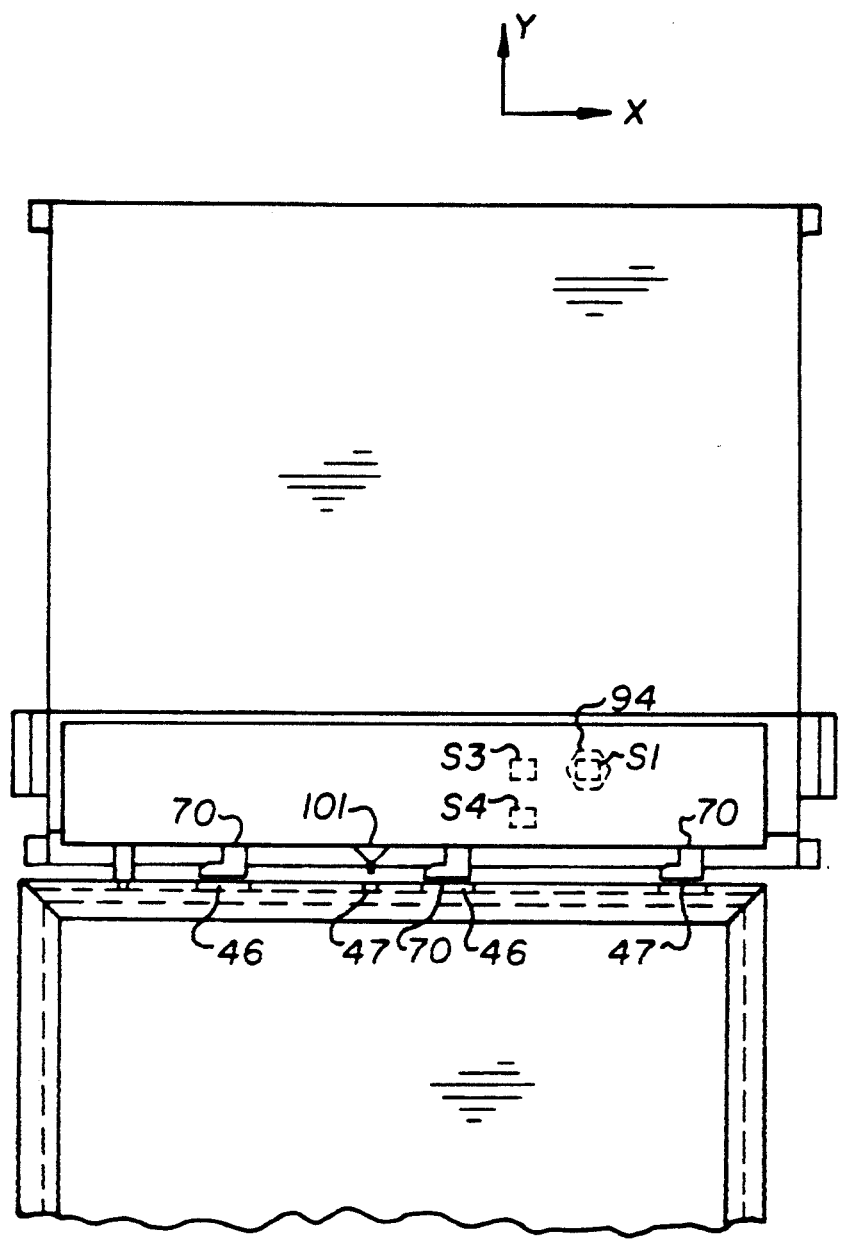
Figure 4D:
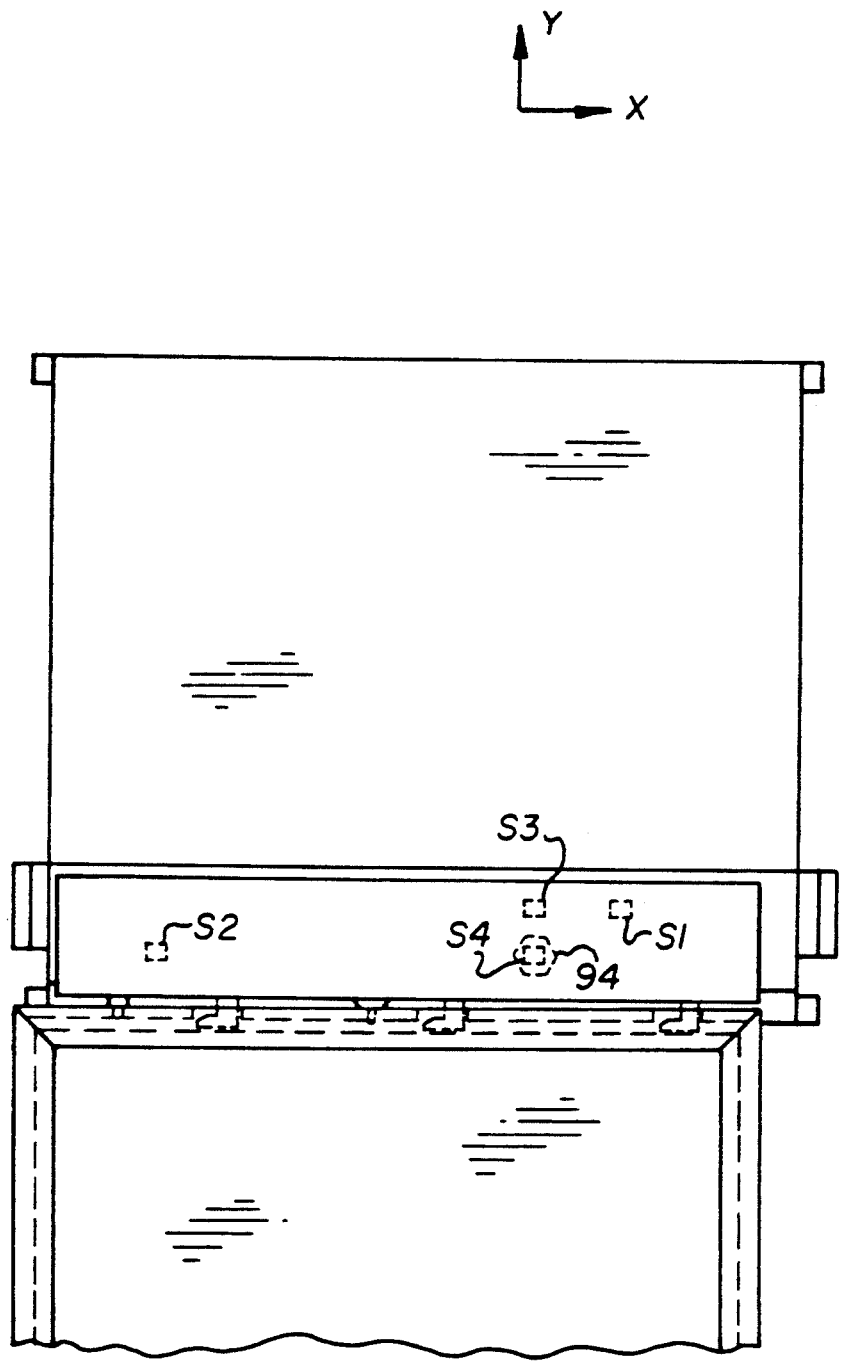

Referring to FIG. 4, there is illustrated a cassette 12 properly positioned within the clamp jaws 26,28 and the extractor bar assembly 30 is in the neutral position. In order to properly engage the extractor bar mechanism with respect to the cassette 12, the apparatus is first put into a seek position as illustrated in FIG. 4A. In the seek position, the extractor bar assembly 30 is positioned so that the pin 78 will be placed in a position downward of alignment opening 44 in cassette 12 such that the extractor bar assembly 30 must be moved in a positive X direction before the pin 78 will engage opening 44. The neutral position, by definition, is a position which is downward of opening 44. The extractor bar assembly 30 is driven from the neutral position toward the cassette 12. Thus, the extractor bar assembly 30 is driven until sensor S1 senses magnetic housing 94 and will thus provide a signal to the microprocessor that the cassette is in the seek position. When the extractor bar assembly 30 is in the seek position, as illustrated in FIG. 4A, the distance D between the front of the cassette 12 and the front of the locator slide plate 48 is a predetermined distance. The distance D is such that the pin 78 is deflected slightly such that when the pin 78 engages the opening 44 in cassette 12, it will be able to pop into opening 44. In the particular embodiment illustrated the distance D is about 0.230 inches (0.5842 cms). From the seek position the stage 16 is driven in the positive X direction until the pin 78 engages opening 44, as shown in FIG. 4B, which will, in turn, provide an appropriate signal to the microprocessor that the home position has been reached. In the particular embodiment illustrated this is accomplished by sensor S2 located on stage 16 such that it will pick up the change in magnetic flux caused by the magnetic collar 83 located on pin 78 moving as pin 78 drops into opening 44. This home position provides a reference point with respect to openings 46 as openings 46 are placed in the cassette at predetermined position with resect to opening 44. Typically the openings 44,46 provided in cassette 12 are provided in a single element, such as a end cap. Therefore, the locations of these openings with respect to each other can be maintained very accurately without substantial expense. Accordingly, having located the alignment opening the remaining openings will be at a fixed predetermined distance and thus can be easily located. Once the extractor bar assembly 30 has located the home position, the stage 16 continues to be driven in the positive X direction until housing has moved a predetermined distance. Since a stepper motor 23 is used to move the stage 16, the stage can be moved a precise distance from the home position. However, since pin 78 has engaged the opening 44 in cassette 12, the locator slide plate 48 will remain behind while the extractor bar 50 will continue with the stage 16 in the positive X direction. The stage 16 is driven until the hook members 70 align with the access opening 46 in the cassette latching mechanism as illustrated in FIG. 4C. This position is verified by sensor S3 which senses magnetic housing 94.

At this time the stage 16 remains stationary and the extractor bar assembly 30 is then driven in the negative Y direction until the cassette closure position switch SW1, as shown in FIG. 4, is actuated. At this point, the hook members 70 have entered the cassette 12 and are in position to unlatch the cassette 12. Verification of the extractor bar assembly location is made by senor S4 sensing magnetic housing 94.

Figure 4E:
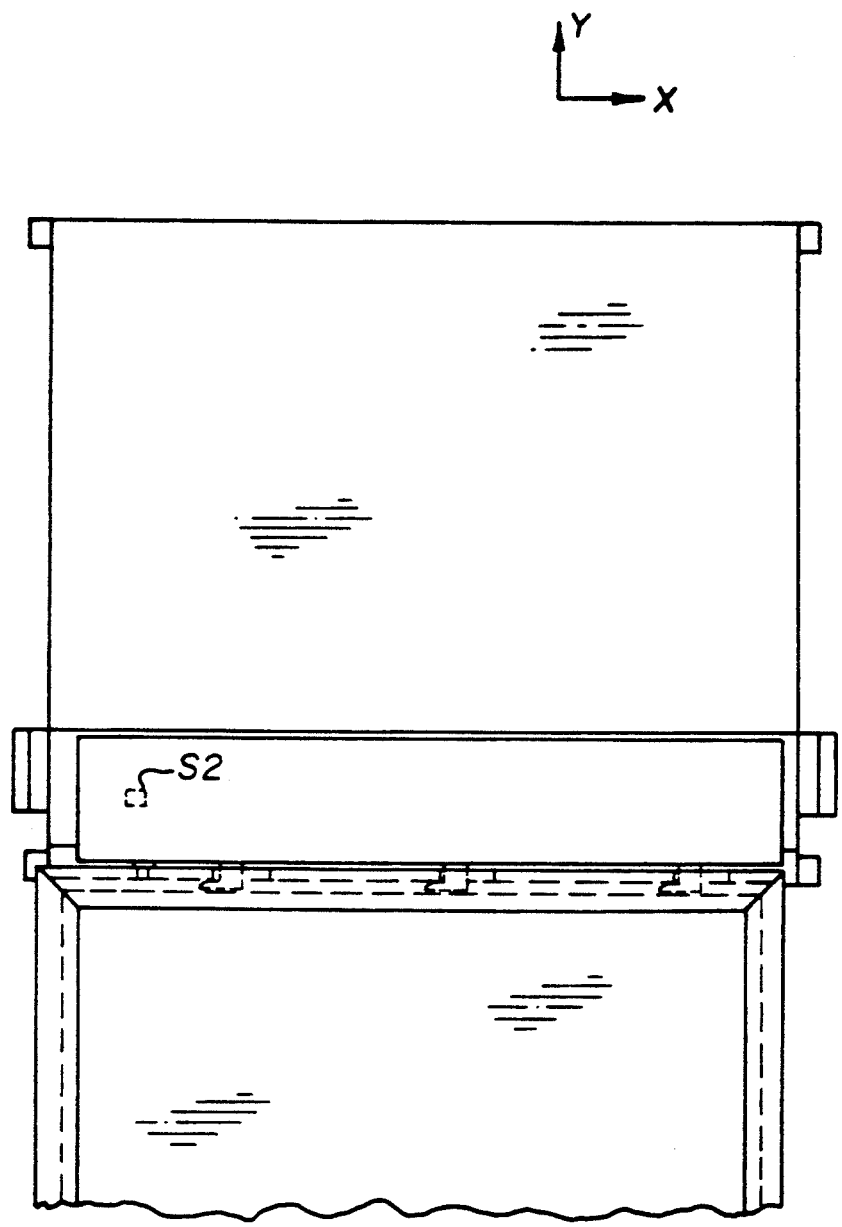

The stage 16 is then driven in the negative X direction until back at the home position where the locator pin 78 initially engaged the cassette as illustrated by FIG. 4E. This is easily accomplished as the stepper motor allows the stage to be driven back the exact distance it was moved initially therefrom. At this point, the cassette 12 has been unlatched. Verification of the position of the extractor bar 50 is made by reactivation of sensor S2.

The extractor bar assembly 30 is then driven in the positive Y direction, removing the end cap 42 and stimulable phosphorus plate 14 from cassette 12. The extractor bar assembly 30 continues to be driven in the positive Y direction until the plate has been fully extracted. This position is determined by actuation of switch SW2. The phosphorus plate 14 is now in position on the stage 16 for reading by the reader. The stage 16 is driven in a negative X direction through the scan position 22 after which it is driven in the positive X direction to the erase position (not shown) for erasure. After erasure, the stage 16 with extractor bar assembly 30 is driven in the positive X direction until the extractor bar assembly 30 is in the home position for that cassette. Since a stepper motor 23 is used to drive stage 16, the exact location for the home position can be recorded by the microprocessor. This home position can vary from cassette to cassette. As previously discussed, the home position is determined when pin 78 engages opening 44. Therefore, the plate 14 can be easily realigned for placement back into cassette 12. Once in the home position, the extractor bar assembly 30 is driven in the negative Y direction until the cassette closure position switch SW1 is activated at which time the phosphorus plate 14 is then located back within the cassette 12.

The stage 16 and hooks are driven in the positive X direction relatching the cassette 12. Verification of this relatching takes place when the embedded latch sensor S4 is actuated. The extractor bar assembly is then driven in the positive Y direction to the original entry position. This motion trips a hook position sensor S3 verifying the movement. The hook members 70 are now driven in the negative X direction to the original locator pin drop point (home position) and this position is verified by the actuation by locator pin sensor S2. The extraction bar assembly then moves in the positive Y direction. This position may be sensed by the plate side switch SW2, or may be a variable position obtained by driving assembly motor for a pre-set amount of time. The complete stage 16 moves in the negative X direction to the neutral position (as shown in FIG. 4) to complete the extraction cycle. At this time, the clamping mechanism is released for returning of the cassette 12 back to the autoloader or the operator as appropriate.

Figure 4F:
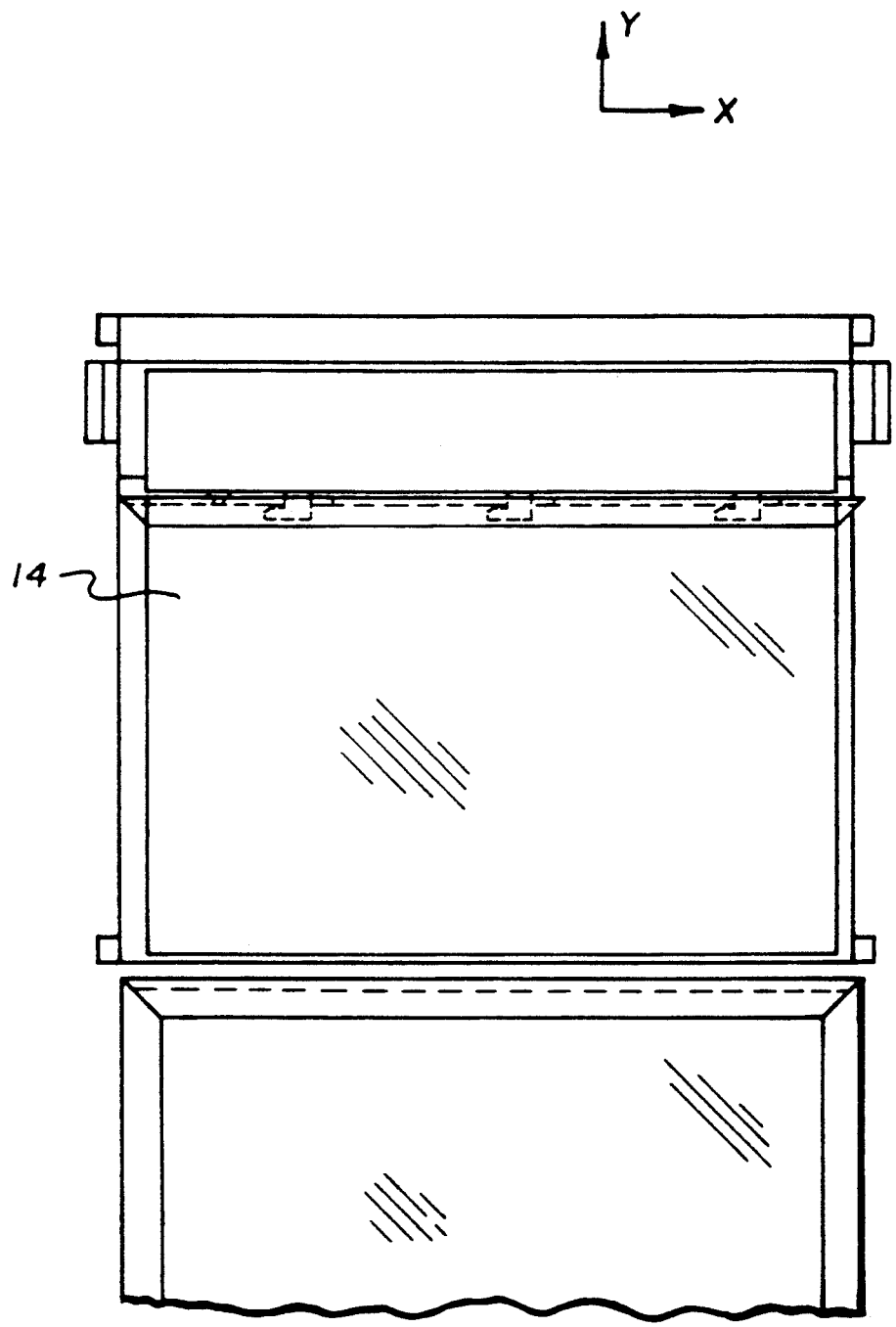

The stage 16 may be provided with means for supporting the plate 14 when the extractor bar assembly 30 is in the fully retracted position as shown in FIG. 4F. In the particular embodiment illustrated, a pair of retractable supports 132 are provided. The retractable supports 132 provide a sufficient upward support for supporting the bottom of plate, but are also of a design such that they can extend down into the stage 16 as the extractor bar assembly 30 passes thereover. It is, of course, understood that any desired number of supports may be provided so long as they do not interfere with the operation of the mechanism.

In the embodiment illustrated means are provided for determining the size of the photostimulable plate 14. In particular, there is provided a plurality of sensor switches 134, FIG. 3 which are located such that, depending on which particular switches 134, FIG. 3 are being activated, the particular size of the plate can be readily determined. In the embodiment illustrated FIG. 3, three switches 134 are used, however, any desired number may be provided and located as appropriate.

The present invention provides a relatively simple mechanism for unlatching and latching of a cassette, that is able to accurately locate the cassette even if the cassette is not presented exactly in the same position each time a cassette is fed to the mechanism and can also take into consideration normal manufacturing tolerances of the cassette.

It is to be understood that various modifications and changes may be made without departing from the scope of the present invention, the present invention being limited by the following claims:

We claim:

1. In an apparatus for unlatching a stationary cassette having a latching mechanism for allowing removal of a photosensitive element disposed within the cassette, said cassette having an end cap, the end cap having reference means for locating a first relative position with respect to the latching mechanism of the cassette and at least one access opening for allowing access to the latching mechanism and removal of the photosensitive element, said apparatus comprising:

a stage;

means for moving said stage in a first direction with respect to the cassette;

an extractor bar assembly movably mounted to said stage for movement in a second direction with respect to the cassette, said extractor bar assembly having unlatching means for unlatching the latching mechanism of the cassette and for removing the removable photosensitive element disposed in the cassette;

means for moving said extractor bar assembly in said second direction; and means for locating said extractor bar assembly in a first relative position with respect to the latching mechanism of the cassette.

2. In an apparatus according to claim 1 wherein said reference means for locating a first relative position with respect to the latching mechanism comprises an alignment opening.

3. In an apparatus according to claim 2 wherein said means for locating said extractor bar in a first position with respect to the latching mechanism of the cassette comprises a retractable pin designed to engage the alignment opening provided in the end cap of the cassette.

4. In an apparatus according to claim 1 further comprising means for sensing when said extractor bar assembly is in said first relative position.

5. In an apparatus according to claim 4 wherein said means for sensing when said extractor bar assembly is in said first relative position comprises a magnetic collar placed on said pin such that a signal is produced when said pin engages said alignment opening.

6. In an apparatus according to claim 1 wherein said extractor bar assembly comprises:

a slide plate; and a extractor bar slideably secured to said slide plate such that when said pin engages said reference opening said slide plate will be stationary with respect to said cassette while said extractor bar can still move with respect to said cassette.

7. In an apparatus according to claim 1 wherein said extractor bar includes a hook member having at least one hook for insertion through said at least one access opening for engaging said latching mechanism of said cassette and unlatching said cassette.

8. In an apparatus according to claim 7 wherein means are provided for allowing said hook member to adjust to the position of the access opening so that said at least one hook can enter said access opening.

9. In an apparatus according to claim 8 wherein said means for allowing said hook member to adjust to the position of the access opening comprise the use of a spring washer placed between the hook member and means for securing the hook member to the extractor bar.

10. In an apparatus according to claim 1 further comprising sensing means for determining when said unlatching means has been moved to a second position so that said unlatching means can engage the latching mechanism of the cassette.

11. In an apparatus according to claim 1 further comprising means for sensing when hook assembly has unlatched the latching mechanism of said cassette.

12. In an apparatus according to claim 1 wherein said extractor bar assembly comprises an extractor bar having sides, a slide plate slideably mounted to the extractor bar for movement in a direction transverse to the cassette, and a hook bar secured to said extractor bar.

13. In an apparatus according to claim 1 wherein said photosensitive element comprises a photostimulable plate.

14. In an apparatus according to claim 1 wherein said means for moving said stage comprises a drive screw, a drive nut secured to said drive screw, a motor for turning said drive screw having an axis for moving the drive nut along the axis of the drive screw, and means connecting said drive nut to said stage.

15. In an apparatus according to claim 12 wherein extractor bar has a pair of end sections, said end sections being connected to the sides of the extractor bar and being slideably mounted to the sides of the stage.

16. In an apparatus according to claim 15 wherein said means for moving said extractor bar assembly comprises a closed loop cable, said cable being connected to said end sections, said cable being driven by a reversible motor.

17. In an apparatus according to claim 6 wherein said slide plate is secured to said extractor bar by an extension spring.

18. In an apparatus according to claim 1 wherein said first direction is transverse to said cassette.

19. In an apparatus according to claim 1 wherein said second direction is toward and/or away from the cassette.

20. In an apparatus according to claim 1 further comprising means for supporting said photographic element on said stage.

21. In an apparatus according to claim 1 further comprising means for determining the size of the photosensitive element.

22. In an apparatus according to claim 21 wherein said means for determining the size of the photosensitive element comprises a plurality of sensor switches placed on stage.

23. In an apparatus according to claim 1 further comprising clamping means for clamping the cassette in stationary position.

24. In an apparatus according to claim 14 wherein said motor comprises a stepper motor.

25. A method of unlatching a cassette and removing a photosensitive element therefrom, said cassette having a removable photosensitive element disposed within the cassette and a latching mechanism for latching and unlatching the photosensitive element from the cassette, comprising the steps of:

providing an apparatus for unlatching a cassette and removing a photosensitive element therefrom, said apparatus comprising:

a stage;

means for clamping said cassette;

means for moving said stage in a first direction with respect to the cassette placed in said means for clamping the cassette;

an extractor bar assembly movably mounted to said stage for movement in a second direction with respect to the cassette, said extractor bar assembly having means for unlatching and latching the latching mechanism of the cassette and for removing the removable photosensitive element disposed in the cassette;

means for moving said extractor bar assembly in said second direction; and means for determining a first relative position between the latching mechanism of the cassette and said extractor bar assembly;

moving said extractor bar assembly to a first seek position at a spaced predetermined distance from the latching mechanism;

moving said extractor bar assembly in a transverse direction until said first relative position is determined;

moving said extractor bar assembly in the same transverse direction a predetermined distance so that said extractor bar assembly is in a second relative position with respect to the cassette so that said unlatching means can be inserted into the cassette;

moving said extractor bar assembly toward the cassette so that the unlatching mechanism of the extraction bar is within the latching mechanism of the cassette;

moving said extractor bar assembly in a transverse direction such that the extractor bar assembly is moved back to said first relative position so as to unlatch the photosensitive element from the cassette; and moving the extractor assembly in a direction away from the cassette so as to remove the photosensitive element from the cassette.

26. A method of unlatching a cassette and removing a photosensitive element therefrom, said cassette having a removable photosensitive element disposed within the cassette and a latching mechanism for latching and unlatching the photosensitive element from the cassette, comprising the steps of:

providing an apparatus for unlatching a cassette and removing a photosensitive element therefrom, said apparatus comprising:

a stage;

means for clamping said cassette;

means for moving said stage in a first direction with respect to the cassette placed in said means for clamping the cassette;

an extractor bar assembly movably mounted to said stage for movement in a second direction with respect to the cassette, said extractor bar assembly having means for unlatching and latching the latching mechanism of the cassette and for removing the removable photosensitive element disposed in the cassette;

means for moving said extractor bar assembly in said second direction; and means for determining a first relative position between the latching mechanism of the cassette and said extractor bar assembly;

moving said extractor bar assembly to a first seek position at a spaced predetermined distance from the latching mechanism; and moving said extractor bar assembly in a transverse direction until said first relative position is determined.

27. In a method according to claim 26 wherein said first direction is transverse to said cassette.

28. In a method according to claim 26 wherein said second direction is toward and/or away from the cassette.

29. A reader for reading a photostimulable element disposed in a cassette, said cassette having a latching mechanism for allowing removal of the photostimulable element disposed within the cassette, said cassette having a removable end cap, the end cap having reference means for locating a first relative position with respect to the latching mechanism of the cassette and at least one access opening for allowing access to the latching mechanism, said reader comprising:

a stage;

means for moving said stage in a first direction with respect to the cassette;

an extractor bar assembly moveably mounted to said stage for movement in a second direction with respect to the cassette, said extractor bar assembly having unlatching means for unlatching the latching mechanism of the cassette and for removing the removable photographic element disposed in the cassette;

means for moving said extractor bar assembly in said second direction; and means for locating said extractor bar assembly in a first relative position with respect to the latching mechanism of the cassette.

30. A reader for reading a photostimulable element disposed in a cassette, said cassette having a latching mechanism for allowing removal of the photostimulable element disposed within the cassette, said cassette having a reference means for locating a first relative position with respect to the latching mechanism of the cassette and at least one access opening for allowing access to the latching mechanism, said reader comprising:

a movable extractor bar assembly having means for unlatching and latching the latching mechanism of the cassette and for removing the removable photostimulable element disposed in the cassette, said extractor bar assembly comprising a slide plate and an extractor bar slideably secured to said slide plate and movable along at least two axes relative to the cassette; and means for locating said extractor bar assembly in a first relative position with respect to the latching mechanism of the cassette.

31. In a reader according to claim 30 wherein said reference means for locating a first relative position with respect to the latching mechanism comprises an alignment opening.

32. In a reader according to claim 31 wherein said means for locating said extractor bar assembly in a first position with respect to the latching mechanism of the cassette comprises a retractable pin designed to engage the reference opening provided in the end cap of the cassette.

33. In a reader according to claim 30 further comprising means for sensing when said extractor bar assembly is in said first relative position.

34. In a reader according to claim 33 wherein said means for sensing when said extractor bar assembly is in said first relative position comprises a magnetic collar placed on said pin such that a signal is produced when said pin engages said reference opening.

35. In a reader according to claim 32 wherein said extractor bar
is slideably secured to said slide plate such that when said pin engages said reference opening said slide plate will be stationary with respect to the cassette while said extractor bar can still move with respect to the cassette.

36. In a reader according to claim 30 wherein said extractor bar includes a hook member having at least one hook for insertion through said at least one access opening for engaging said latching mechanism of said cassette and unlatching said cassette.

37. In a reader according to claim 36 wherein means are provided for allowing said hook member to adjust to the position of the access opening so that said at least one hook can enter said access opening.

38. In a reader according to claim 37 wherein said means for allowing said hook member to adjust to the position of the access opening comprises the use of a spring washer place between the hook member and means for securing the hook member to the extractor bar.

39. In a reader according to claim 30 further comprising sensing means for determining when said unlatching means has been moved to a second position so that said unlatching means can engage the latching mechanism of the cassette.

40. In a reader according to claim 30 further comprising means for sensing when hook means has unlatched the latching mechanism of said cassette.

41. In a reader according to claim 30 wherein said extractor bar assembly comprises an extractor bar having sides, a slide plate slideably mounted to the extractor bar for movement in a direction transverse to the cassette, and a hook bar secured to said extractor bar.

42. In a reader according to claim 30 wherein said photosensitive element comprises a photostimulable plate.

43. In a reader according to claim 30 wherein said means for moving said stage comprises a drive screw, a drive nut secured to said drive screw, a motor for turning said drive screw for moving the drive nut along the axis of the drive screw, and means connecting said drive nut to said stage.

44. In a reader according to claim 41 wherein extractor bar has a pair of end sections, said end sections being connected to the sides of the extractor bar and being slideably mounted to the sides of the stage.

45. In a reader according to claim 44 wherein said means for moving said extractor bar assembly comprises a closed loop cable, said cable being connected to said end sections, said cable being driven by a reversible motor.

46. In a reader according to claim 35 wherein said slide plate is secured to said extractor bar by an extension spring.

47. In a reader according to claim 30 wherein said first direction is transverse to said cassette.

48. In a reader according to claim 30 wherein said second direction is toward and/or away from the cassette.

49. In a reader according to claim 30 further comprising means for supporting said photosensitive element on said stage.

50. In a reader according to claim 30 further comprising means for determining the size of the photosensitive element.

51. In a reader according to claim 50 wherein said means for determining the size of the photosensitive element comprises a plurality of sensor switches placed on stage.

52. In a reader according to claim 30 further comprising clamping means for clamping the cassette in stationary position.

53. In a reader according to claim 43 wherein said motor comprises a stepper motor.

* * * * *